United States Patent
Wolcott et al.

(10) Patent No.: US 12,325,154 B2
(45) Date of Patent: Jun. 10, 2025

(54) SYSTEMS FOR POLYMER POWDER PERFORMANCE IMPROVEMENTS IN ADDITIVE MANUFACTURING USING ENCAPSULATION

(71) Applicant: GM GLOBAL TECHNOLOGY OPERATIONS LLC, Detroit, MI (US)

(72) Inventors: Paul J Wolcott, Macomb, MI (US); Adam McFarland, Royal Oak, MI (US); Andrew Thomas Cunningham, Royal Oak, MI (US); Malini Dusey, Dearborn, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 18/176,824

(22) Filed: Mar. 1, 2023

(65) Prior Publication Data
US 2024/0293959 A1    Sep. 5, 2024

(51) Int. Cl.
*B29C 64/00* (2017.01)
*B29B 7/00* (2006.01)
*B29C 64/153* (2017.01)
*B29C 64/314* (2017.01)
*B29K 101/12* (2006.01)
*B29K 421/00* (2006.01)
*B33Y 10/00* (2015.01)
*B33Y 30/00* (2015.01)
*B33Y 40/10* (2020.01)

(52) U.S. Cl.
CPC ............ *B29B 7/002* (2013.01); *B29C 64/153* (2017.08); *B29C 64/314* (2017.08); *B29K 2101/12* (2013.01); *B29K 2421/003* (2013.01); *B33Y 10/00* (2014.12); *B33Y 30/00* (2014.12); *B33Y 40/10* (2020.01)

(58) Field of Classification Search
CPC ..... B29C 64/314; B29C 64/153; B33Y 10/00; B33Y 30/00; B33Y 40/10; B33Y 70/10
See application file for complete search history.

(56) References Cited

U.S. PATENT DOCUMENTS

| | | | |
|---|---|---|---|
| 11,447,629 B2 * | 9/2022 | Rodgers | ................ B29C 64/106 |
| 2019/0047215 A1 | 2/2019 | Ge et al. | |
| 2023/0017838 A1 | 1/2023 | Rodgers et al. | |

FOREIGN PATENT DOCUMENTS

| | | | |
|---|---|---|---|
| CA | 2970899 | * | 6/2020 |
| DE | 102019103377 A1 | | 12/2019 |
| WO | WO2020102025 | * | 5/2020 |

* cited by examiner

Primary Examiner — Edmund H Lee
(74) Attorney, Agent, or Firm — Lorenz & Kopf LLP

(57) ABSTRACT

Systems and methods for manufacturing a product include a mixing station for preparing a solution containing a base material and a performance modifier. The base material is configured to deliver performance characteristics of the product that are preselected and the performance modifier is configured to enhance the performance characteristics. An encapsulation station produces particles of the performance modifier in a coating of the base material as an encapsulate powder. An additive manufacturing cell includes an energy source and is used to build the product from the encapsulate powder by an application of energy from the energy source.

20 Claims, 4 Drawing Sheets

SYSTEMS FOR POLYMER POWDER PERFORMANCE IMPROVEMENTS IN ADDITIVE MANUFACTURING USING ENCAPSULATION

The present disclosure relates to additive manufacturing systems and methods that include polymer powder fusion, and more particularly relates to performance improvements of powders in additive manufacturing by encapsulating a performance improving material in an additive manufacturing compatible base material.

Additive manufacturing/3D printing technologies have come into widespread use due to their desirable qualities such as efficiency and flexibility. Various types of 3D printing technologies have been developed for creating objects from metal, ceramic and polymer materials. The various 3D printing technologies each generally includes a build surface, a material delivery system, an energy delivery system, and a control system. The build surface provides a reference surface upon which the material is deposited, layer-by-layer to successively build up the part according to design details. The material delivery system performs the depositing of a feedstock material, such as in a particle, fiber or filament form, for fusing with the previously deposited layer. The energy delivery system adds energy to the feedstock material before, during and/or after deposition for liquifying/fusing the material into the part being created. The control system operates each of the other systems in building the object being created, such as according to math data definition.

While additive manufacturing is expanding in use, producing parts from certain polymers that have desirable performance characteristics is challenging because feedstock materials may have constituents with differing melting properties leading to nonhomogeneous fusion. For example, some constituents may inadequately melt and/or other constituents may excessively melt, burn, or smoke when a same amount of energy is applied, which may affect laser optics in printing. Another challenge is that additive manufacturing may lead to higher crystallinity in the same materials when compared to traditional manufacturing like injection molding. This higher crystal content may lead to higher brittleness.

Accordingly, it is desirable to provide improved methods and systems for building parts using additive manufacturing from materials with desirable performance characteristics that are not amenable to certain additive manufacturing processes. Furthermore, other desirable features and characteristics of the present disclosure will become apparent from the subsequent detailed description and the appended claims, taken in conjunction with the accompanying drawings and the foregoing technical field and background.

SUMMARY

Methods and systems are provided for manufacturing a product from an encapsulate. A system includes a mixing station for preparing a solution containing a base material and a performance modifier. The base material is configured to deliver performance characteristics of the product that are preselected and the performance modifier is configured to enhance the performance characteristics. An encapsulation station produces particles of the performance modifier in a coating of the base material as an encapsulate powder. An additive manufacturing cell includes an energy source and is used to build the product from the encapsulate powder by an application of energy from the energy source.

In additional embodiments, the energy source operates to fuse the encapsulate powder together by melting and/or sintering the base material.

In additional embodiments, the performance modifier is an impact modifier configured to strengthen an impact resistance of the base material.

In additional embodiments, the additive manufacturing cell includes a powder bed fusion type printer and the base material is compatible with the powder bed fusion type printer.

In additional embodiments, the mixing station operates to prepare the solution as an emulsion.

In additional embodiments, the performance characteristics include impact strength.

In additional embodiments, the base material protects the performance modifier from the energy source during the application of energy.

In additional embodiments, the base material is a thermoplastic.

In additional embodiments, the performance modifier is an elastomer.

In additional embodiments, the base material is a thermoplastic and the performance modifier is an elastomer.

In a number of additional embodiments, a method for manufacturing a product, includes mixing, in a mixing station, a solution containing a base material and a performance modifier. Performance characteristics of the product are selected. The base material is selected to deliver, along with the performance modifier, the performance characteristics of the product. The performance modifier is selected to enhance the performance characteristics. Particles of the performance modifier in a coating of the base material is produced as an encapsulate powder, from the solution and in an encapsulation station. The product is built, from the encapsulate powder in an additive manufacturing cell that includes an energy source, by an application of energy from the energy source.

In additional embodiments, the energy source fuses the encapsulate powder together by melting the base material.

In additional embodiments, an impact resistance of the base material is strengthened by adding the performance modifier as an impact modifier.

In additional embodiments, the additive manufacturing cell includes a powder bed fusion type printer. The base material is selected for compatibility with the powder bed fusion type printer.

In additional embodiments, the solution is prepared as an emulsion in the mixing station.

In additional embodiments, an impact strength is selected as a part of the performance characteristics.

In additional embodiments, the base material protects the performance modifier from the energy source during the application of energy.

In additional embodiments, a thermoplastic is selected as the base material.

In additional embodiments, an elastomer is selected as the performance modifier.

In a number of other embodiments, a composition in powder form is adapted for use in additive manufacturing of a product. The composition includes particles of a performance modifier encapsulated in a base material. The base material is a thermoplastic and delivers selected performance characteristics of the product. The performance modifier changes the selected performance characteristics of the product when incorporated in the base material.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction, summary or this detailed description.

Figure 1:
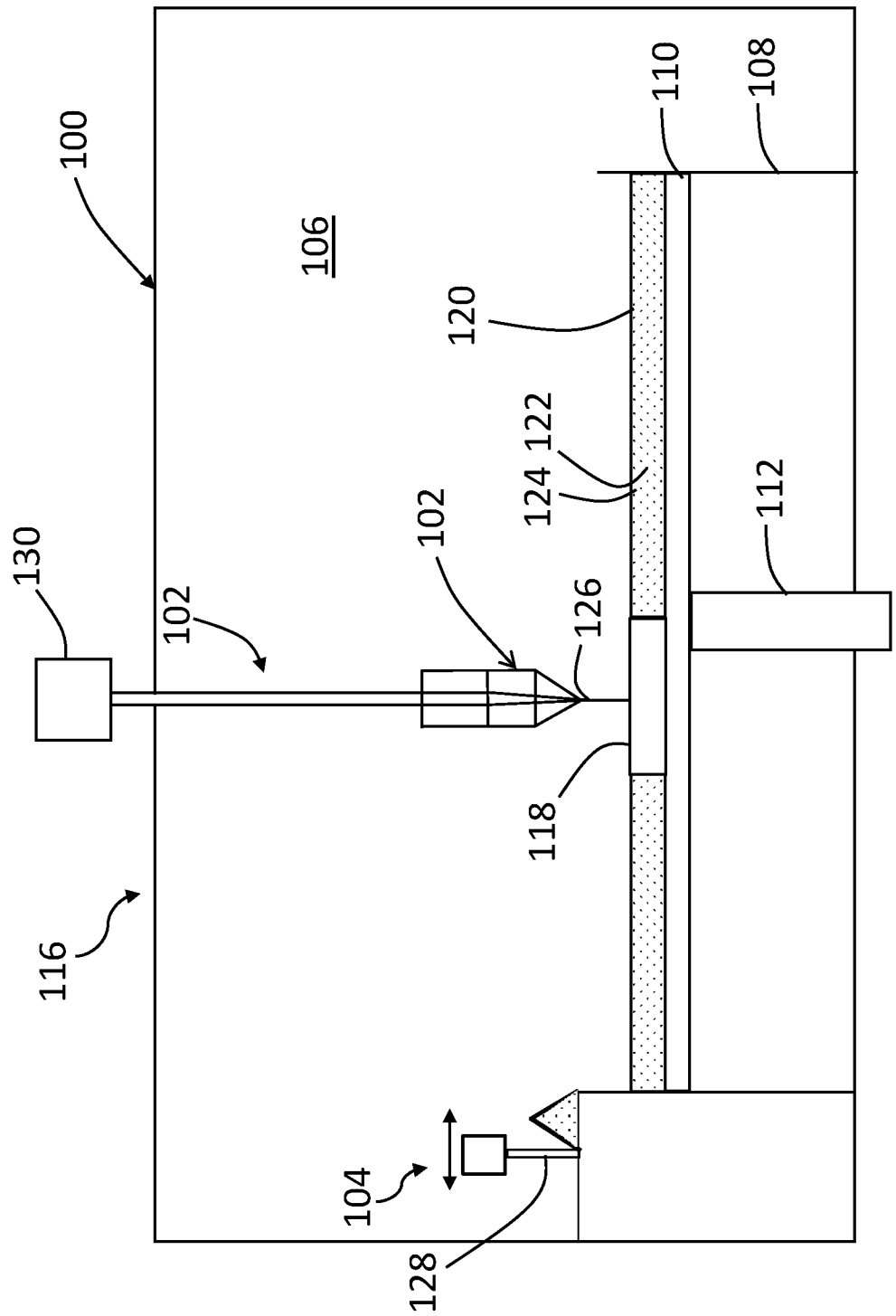
FIG. 1 is a schematic diagram of an additive manufacturing system in the process of building a product, in accordance with various embodiments.

Referring to FIG. 1, an additive manufacturing cell 100 is schematically illustrated. In general, the additive manufacturing cell 100, which may also be referred to as a 3D printing system, includes an energy delivery system in the form of an energy source 102, which may be of the heat producing type, a material deposition system in the form of a material depositor 104, a build chamber 106 defined by a build box 108, and a build platform 110 with an elevator 112. In a number of embodiments, a gas delivery system (not shown), may be included for delivery of an inert gas to the build chamber 106 to provide a favorable environment for the build. In the current embodiment, the additive manufacturing cell 100 is illustrated as a system 116 employing a powder bed fusion type additive manufacturing/3D printing technology. In other embodiments, the additive manufacturing cell 100 may be configured for high-speed sintering, selective laser sintering, multi-jet fusion or another type of additive manufacturing. It will be appreciated that the part 118 being printed may be built of a material 120 that is, or includes, a polymer. Accordingly, the 3D printing approach selected may be tailored to the materials 120 selected for forming the part 118.

In various embodiments, the part 118 that is being built may be an automotive interior product with a surface that faces into the cabin of the associated vehicle. As such, the part 118 exhibits a degree of static stiffness and desirably deforms when subjected to certain loads (e.g., impacts). The material 120 used is selected to produce a product with complex geometry. The material 120 may be prepared with desirable impact strength, stiffness and durability properties containing a base material 122 and a performance modifier 124 material for desired properties in producing a part 118. In one example, the desired properties include impact strength and may include deformability and/or energy absorption characteristics. For example, the performance modifier 124 may include a component that has desirable physical properties such as being elastomeric in nature to absorb energy or dissipate energy to improve impact strength. In other embodiments, the performance modifier 124 may be selected for other characteristics, such as to improve/modify stiffness, thermal/electrical conductivity, thermal/electrical resistance, elongation.

In the current embodiment, the additive manufacturing cell 100 is configured for the application of a powder form of the material 120 by the material depositor 104. The melting/fusing of the material 120 is performed by the energy source 102 via a controlled exposure. The material 120 is applied by a spreader 128 of the material depositor 104 in a series of successive layers onto the build platform 110. The part 118 is successively built up in layers on the build platform 110. In other embodiments, other mechanisms may be used to distribute the material 120 such as a roller, brush, blade, spreader, sprayer, or others.

Energy for fusing the powder particles of the material 120 is provided by the energy source 102. The energy source may be a laser producing a beam 126. The energy source 102 may be operated by a multi-axis positioning system 130. The material 120 is heated to above its melting point to enable fusion with the other particles of the layer and with the previously deposited and fused layer. In other embodiments, another form of energy source 102 may be employed.

The build platform 110 defines the bottom of the build box 108 and is mounted with the elevator 112 for lowering during the build and for raising following the build or in preparation for the next build cycle. In other embodiments, rather than using the elevator 112, the build platform 110 may remain at a static height and the material depositor 104 may change elevation. The part 118 is built up as the layers are deposited. In embodiments, different materials 120 may be deposited to form different features of the part 118. When the forming process for a given layer is completed, the build platform 110 may be lowered by the amount of the layer thickness and the next material layer may be applied. This process is repeated until the entire design geometry of the part 118 is generated.

Because the energy source 102 initiates melting of the material 120, the composition of the material 120 is formulated to respond to the applied energy by melting and fusing together to form a continuous structure of the part 118. Due to the properties of the material 120, melting in a consistent and predictable way is accomplished by a defined preparation of the material 120 for the additive manufacturing process as further described below. Otherwise, the application of energy by the energy source 102 may inconsistently melt the material 120 if not prepared for additive manufacturing such as in a powder bed fusion type additive manufacturing/3D printing.

Figure 2:
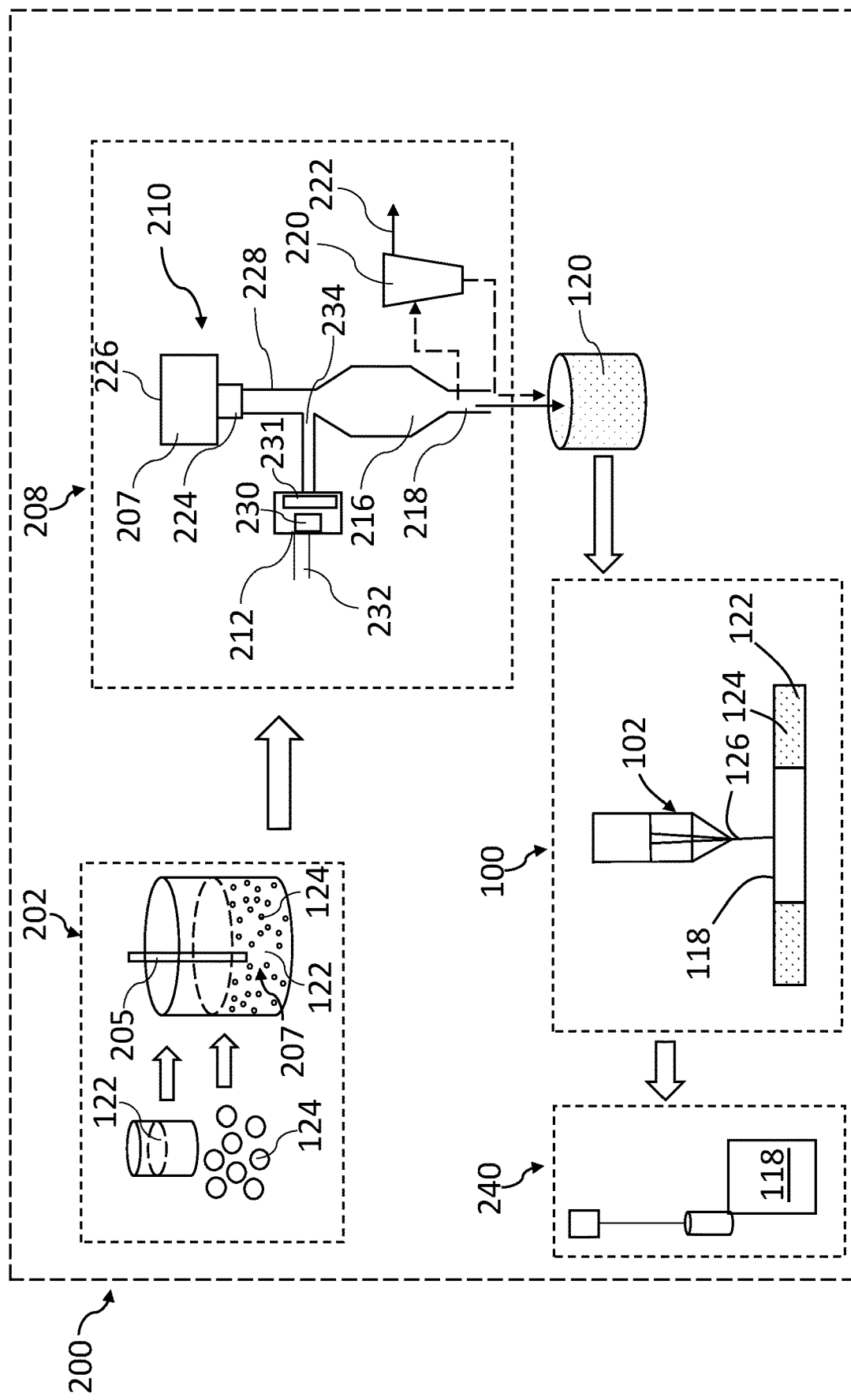
FIG. 2 is a schematic diagram of a system for manufacturing a product using an encapsulated material in the additive manufacturing system of FIG. 1, in accordance with various embodiments.

FIG. 2 illustrates a system 200 for preparing the material 120 for use in the additive manufacturing cell 100 of FIG. 1. Preparation of the material 120 includes formulating the material 120 to have as-printed rigidity, durability and energy absorbing/deformation properties desired for the specific part 118. As in the preceding example, the material 120 includes a base material 122 and a performance modifier 124, and may include other components such as a surfactant and/or a solvent. In a number of embodiments, the base material 122 may be any composition, or its precursor(s)/ingredients desirable for producing the part 118 and compatible with printing in the additive manufacturing cell 100. Accordingly, as used herein, the term base material 122 encompasses a composition, such as polyamide 12, and/or precursor(s)/ingredients of the composition, such as laurolactam. The performance modifier 124 may be any material that imparts a desirable performance characteristic to the base material 122 and that benefits from protection against the application of the energy source 102.

The system 200 includes a mixing station 202 where a mixture of the base material 122 (the desired composition or its precursor(s)/ingredients) in solution and the performance modifier 124, such as in particles/powder form is prepared. For example, the mixing station 202 may include a mixer 205 such as a mechanical agitator or inline static mixer. In the current embodiment the mixing station 202 is configured to prepare an emulsion 207. In an example, the base material 122 is polyamide 12 and the performance modifier is an ethylene propylene diene monomer (EPDM). Other examples for the performance modifier 124 may include various polyamides such as polyamide 11, polyamide 6, other polyamides, polyether ketone, polyether ether ketone, polypropylene, polyethylene, polystyrene, polybutylene, or any material desirable for producing the part 118 and compatible with printing in the additive manufacturing cell 100. In some embodiments, the base material 122 may be a composite of a matrix material and a reinforcing material. In some embodiments, the base material 122 may include one of the foregoing with a reinforcing material such as aluminum powder, glass fibers, carbon fibers, etc. in a matrix material. In one embodiment, the performance modifier 124 may be an elastomer such as EPDM. In other examples, the performance modifier 124 may be nitrile butadiene rubber, silicone based rubber, neoprene, nitrile, fluorocarbons, and/or other synthetic rubbers.

The material 120 may include a resinous thermoplastic ionomer domain such as polyamide 12 and an elastomer or synthetic rubber domain such as EPDM prepared as an emulsion to produce thermoplastic-elastomer like compositions. In an example, the base material 122 (the desired composition or its precursor(s)/ingredients) is mixed with the performance modifier 124 creating an emulsion 207. For example, the emulsion 207 may be an aggregation so that the constituents disperse with each other in a dispersed phase to form a homogeneous solution of a thermoplastic-elastomer blended composition in the mixing station 202. Various emulsion recipes may be employed to produce the desired parameters, including where needed, the inclusion of a surfactant or solvent that assists in forming a dispersion medium to obtain the desired dispersion resulting in the emulsion 207.

The emulsion 207 in a liquid-like form including the base material 122 (the desired composition or its precursor(s)/ingredients), and the performance modifier 124 is converted to an encapsulated powder form of particles through an encapsulation station 208. In an embodiment, spray drying microencapsulation may be used where the base material 122 and the performance modifier 124 in an emulsion solution is atomized and sprayed into a heated atmosphere. As the emulsion solidifies, an encapsulated material is created in powdered form. and then precipitated around the performance improvement material, forming an encapsulated powder material 120. In another embodiment, emulsion polymerization may be used where the base material 122 (the desired composition or its precursor(s)/ingredients) and the performance modifier 124 in solution are solidified such that the performance modifier 124 is encapsulated by the base material 122. In other embodiments with a mixture of the base material 122 (the desired composition or its precursor(s)/ingredients) and the performance modifier 124, a precipitation reaction may be used where the performance modifier 124 is suspended in a solution of the base material 122 (the desired composition or its precursor(s)/ingredients).

In the current embodiment, the encapsulation station 208 generally includes a feeder 210, a gas injector 212, an encapsulation chamber 216 and a delivery chute 218. When needed to remove constituents such as surfactants and/or solvents, the encapsulation station 208 may include a separator 220, such as a cyclone to separate the powder form of the material 120 from vaporized constituents 222 such as surfactants and/or solvents. In other embodiments, the encapsulation station 208 may be configured for spray chilling, solvent evaporation, spray coating, extrusion, or another encapsulation method.

Figure 3:
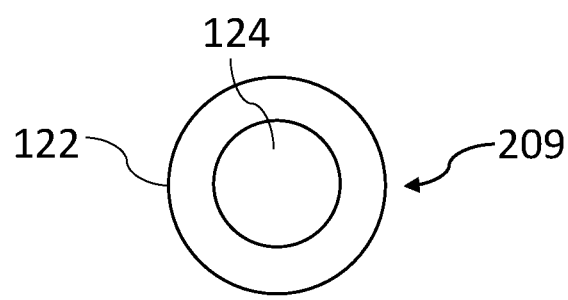
FIG. 3 is a schematic, cross sectional illustration of an encapsulated powder particle produced using the system of FIG. 2.

In this embodiment, the feeder may include a feed control device such as a pump 224 for injecting the emulsion 207, a container 226 with the emulsion 207, and a conduit 228 leading from the container 226 to the encapsulation chamber 216. The gas injector 212 includes a fan 230, a heater 231, a gas inlet 232, and a conduit 234 leading to the encapsulation chamber 216. In one embodiment, the gas is ambient air that is heated by the heater 231. In other embodiments, an inert gas or other gas may be used. The encapsulation chamber 216 provides an enclosure for mixing the emulsion 207 with hot gas wherein the base material 122 (the solidified composition) encapsulates the performance modifier 124 in a core and shell powder form as the material 120. For example, the emulsion 207 is atomized and sprayed into the encapsulation chamber 216. As the emulsion 207 solidifies, an encapsulation material 120 is created in powdered form. In an example, the core is formed of the performance modifier 124 and the shell is formed of the base material 122 (the solidified composition), which completely surrounds the performance modifier 124 core. FIG. 3 schematically illustrates, in cross section, one powder particle 209 of the performance modifier 124 encapsulated in the base material 122.

Figure 4:
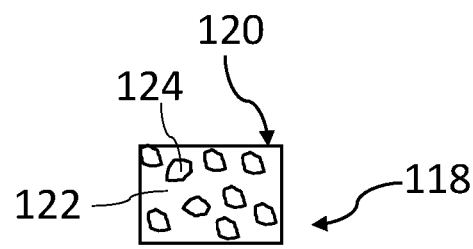
FIG. 4 is a schematic, cross sectional illustration of portion of a part produced using the system of FIG. 2.

The material 120, as an encapsulate powder, is loaded in the additive manufacturing cell 100 and the part 118 is printed. In FIG. 4, a portion of the printed part 118 is shown schematically in cross section. In the printed part 118, the base material 122 surrounds the performance modifier 124 and is melted and fused together forming the part 118 with inclusions of the performance modifier 124 incorporated. In an example, the performance modifier 124 is EPDM and is incorporated in the base material of polyamide 12. As such, the performance modifier 124 is shielded from the full power of the energy source 102 as the base material 122 melts and fuses together forming the part 118. As protected, the performance modifier 124 is not subjected to the full energy of the beam 126. As a result, overheating or burning of the performance modifier 124 by the energy source 102 is avoided.

Figure 5:
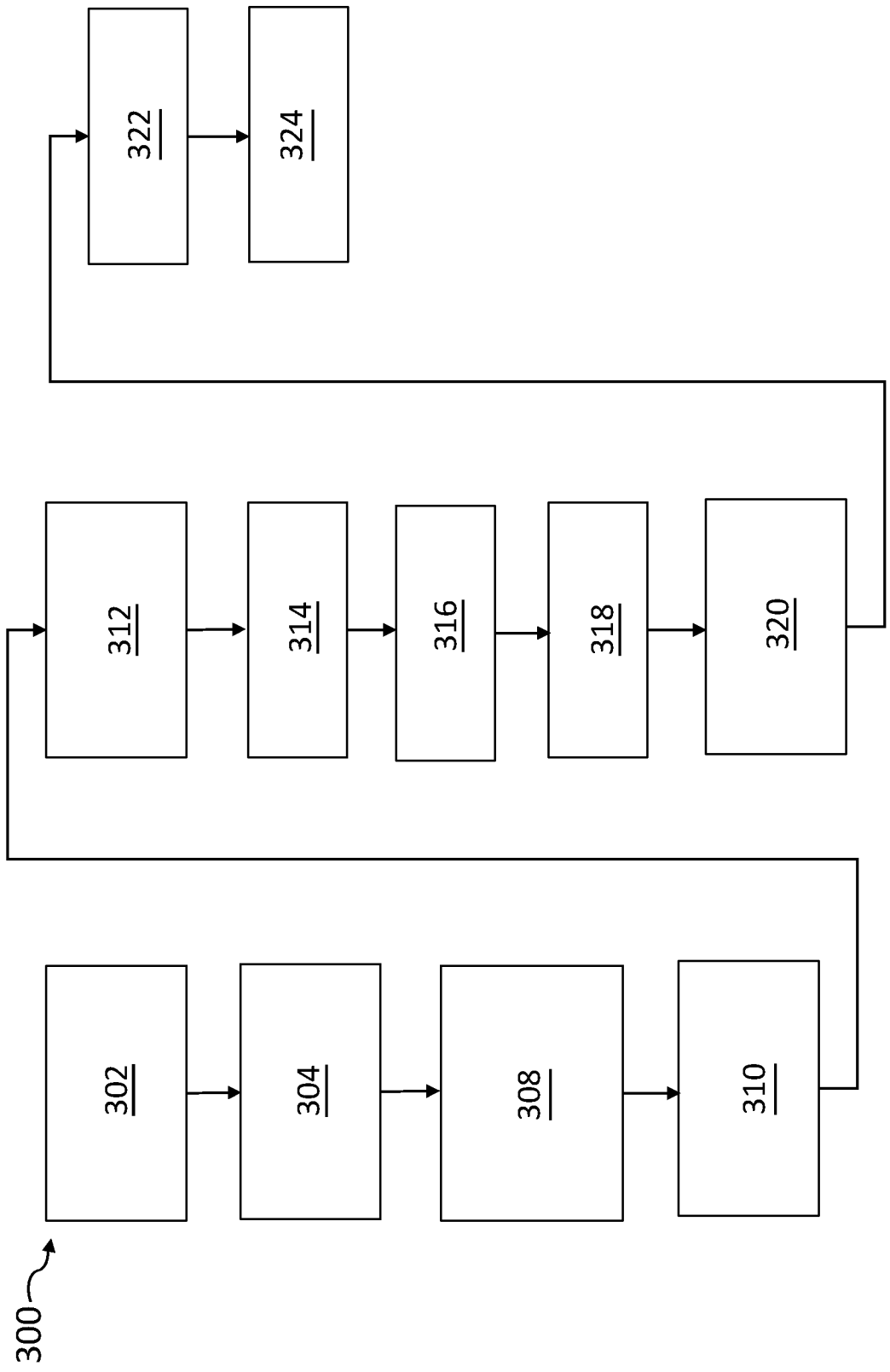
FIG. 5 is a flow chart of process for manufacturing a product using the systems of FIGS. 1 and 2, in accordance with exemplary embodiments.

Referring to FIG. 5, a method 300 for manufacturing a product is illustrated in flow chart form. The order of operation within the method 300 is not limited to the sequential execution as illustrated in FIG. 5, but may be performed in one or more varying orders as applicable and in accordance with the present disclosure. In various embodiments, the method 300 starts and includes determining 302 the requirements for the part 118, including its design and specifications. For example, as an automotive interior part such as a door panel, seat support, console, dash or other panels and parts, the part 118 may be determined 302 to require predetermined physical properties such as toughness, strength, resilience and also surface appearance characteristics. The method 300 includes selecting the system by which the part 118 will be manufactured. For example, the part 118 may be produced using the additive manufacturing cell 100. As such, the feedstock (material 120) will be subjected to intense heat by the energy source 102 and therefore, is required to be respond to the heat by melting and fusing. The method 300 proceeds with selecting 304 the base material 122 for delivering the determined 302 characteristics of the part 118. For example, a thermoplastic such as polyamide 12 may be selected as the base material 122 due to its strength and durability in use as, for example, an automotive interior product, and due to its compatibility with producing the part 118 by additive manufacturing with the energy source 102, such as in the additive manufacturing cell 100. The method 300 includes selecting 308 the performance modifier 124 to impart desirable performance characteristics to the part 118. For example, the cold temperature impact strength of the base material 122, and specifically of the polyamide 12, may be increased by selecting 308 an elastomeric such as EPDM as the performance modifier 124. In other examples, the performance modifier may be selected to modify other characteristics of the part 118.

When the selected 308 performance modifier 124 is not compatible with being subjected to the energy source 102 and/or will not respond in a desirable way, the method 300 proceeds by selecting 310 a mechanism for protecting the performance modifier 124, such as by encapsulation of particles of the performance modifier 124 within the base material 122. For example, the selected 310 mechanism may be encapsulation by spray drying, spray chilling, solvent evaporation, spray coating, extrusion, or others. In the current embodiment, emulsification and spray drying is selected 310. For example, the emulsion 207 is atomized and sprayed into the encapsulation chamber 216. As the emulsion 207 solidifies, an encapsulated material 120 is created in powdered form.

The emulsion 207 of the base material 122 and the performance modifier 124 is prepared 312 by mixing the components together. In an example, the emulsion 207 may include 5-25 percent by weight of performance modifier 124 to base material 122. In embodiments, a surfactant and/or a solvent solution may be added in the emulsion 207 for dispersion and mixing. The mixer 205 may be used to assist in developing a thoroughly mixed homogeneous solution as prepared 312. The method 300 includes feeding 314 the prepared 312 emulsion 207 into the encapsulation chamber 216 along with the heated gas, in this example heated air, for encapsulation 316 of particles of the performance modifier 124 in a coating of the base material 122. If needed, the formed powder material 120 is separated from vaporized solvents, such as by the separator 220.

The resulting material 120 in powder form is collected 318 and loaded 320 into the additive manufacturing cell 100. In the additive manufacturing cell 100, the part 118 is built 322, layer by layer with the base material 122 fusing the powder particles together with the encapsulated performance modifier 124 to form the part 118. Post processing 324 of the part may be carried out following standard practices for additively manufactured parts produced from unmodified feedstock materials, such as de-powdering, along with any necessary machining and finishing. As a result, the part is completed with desirable performance characteristics, enhanced by the performance modifier 124.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for manufacturing a product, comprising:
a mixing station configured to prepare a solution containing a base material and a performance modifier, wherein the base material is configured to deliver performance characteristics of the product that are preselected and the performance modifier is configured to enhance the performance characteristics when the performance modifier is in the base material and forms the product, wherein the performance modifier comprises a material that is not compatible with being subjected to an energy source of additive manufacturing, and wherein encapsulating the performance modifier in the base material comprises an identified mechanism to protect the performance modifier during the being subjected to the energy source;
an encapsulation station configured to produce particles of the performance modifier in a coating of the base material as an encapsulate powder; and
an additive manufacturing cell including the energy source and configured to build the product from the encapsulate powder by an application of energy from the energy source,
wherein the performance modifier is shielded during the build from the energy source by the base material,
wherein the performance modifier is incorporated into the base material after the build and in the product.

2. The system of claim 1, wherein the energy source is configured to fuse the encapsulate powder together by melting and/or sintering the base material.

3. The system of claim 1, wherein the performance modifier comprises an impact modifier configured to strengthen an impact resistance of the base material.

4. The system of claim 1, wherein the additive manufacturing cell comprises a powder bed fusion type printer and the base material is compatible with the powder bed fusion type printer.

5. The system of claim 1, wherein the mixing station is configured to prepare the solution as an emulsion.

6. The system of claim 1, wherein the performance characteristics comprise impact strength and deformability and energy absorption as a part of the performance characteristics.

7. The system of claim 1, wherein the base material is configured to protect the performance modifier when shielded from the energy source during the application of energy to avoid overheating, decomposition and burning of the performance modifier.

8. The system of claim 1, wherein the base material comprises a polyamide.

9. The system of claim 1, wherein the performance modifier comprises ethylene propylene diene monomer.

10. The system of claim 1, wherein the base material comprises a thermoplastic and the performance modifier comprises an elastomer.

11. A method for manufacturing a product, comprising:
mixing, in a mixing station, a solution containing a base material and a performance modifier;
selecting performance characteristics of the product;
selecting the base material to deliver, along with the performance modifier, the performance characteristics of the product;

selecting the performance modifier to enhance the performance characteristics when the performance modifier is in the base material and forms the product, wherein the performance modifier comprises a material that is not compatible with being subjected to an energy source of additive manufacturing;

identifying encapsulating the performance modifier in the base material as an identified mechanism to protect the performance modifier during the being subjected to the energy source;

producing, from the solution and in an encapsulation station, particles of the performance modifier in a coating of the base material as an encapsulate powder;

building, in an additive manufacturing cell that includes the energy source, the product from the encapsulate powder by an application of energy from the energy source;

shielding, by the performance modifier during the build, from the energy source by the base material; and effecting incorporation of the performance modifier into the base material after the build and in the product.

12. The method of claim 11, comprising fusing, by the energy source, the encapsulate powder together by melting the base material.

13. The method of claim 11, comprising strengthening an impact resistance of the base material by adding the performance modifier as an impact modifier.

14. The method of claim 11, comprising:

configuring the additive manufacturing cell as a powder bed fusion type printer; and selecting the base material for compatibility with the powder bed fusion type printer.

15. The method of claim 11, comprising preparing, in the mixing station, the solution as an emulsion.

16. The method of claim 11, comprising selecting impact strength and deformability and energy absorption as a part of the performance characteristics.

17. The method of claim 11, comprising protecting, by the shielding by the base material, the performance modifier from the energy source during the application of energy and avoiding overheating of the performance modifier.

18. The method of claim 11, wherein the selecting the base material comprises selecting a thermoplastic.

19. The method of claim 11, wherein the selecting the base material comprises selecting polyamide, and wherein the selecting the performance modifier comprises selecting ethylene propylene diene monomer.

20. A system for manufacturing a product, comprising:

a mixing station configured to prepare a solution containing a base material and a performance modifier, wherein the base material is configured to deliver performance characteristics of the product that are preselected and the performance modifier is configured to enhance the performance characteristics when the performance modifier is in the base material and forms the product including impact strength and energy absorption, wherein the performance modifier comprises a material that is not compatible with being subjected to an energy source of additive manufacturing, and wherein encapsulating the performance modifier in the base material comprises an identified mechanism to protect the performance modifier during the being subjected to the energy source to avoid overheating of the performance modifier;

an encapsulation station configured to produce particles of the performance modifier in a coating of the base material as an encapsulate powder; and an additive manufacturing cell including the energy source and configured to build the product from the encapsulate powder by an application of energy from the energy source, wherein the performance modifier is shielded during the build from the energy source by the base material, wherein the performance modifier is incorporated into the base material after the build and in the product and the base material and the performance modifier are fused together forming the product with inclusions of the performance modifier incorporated.

* * * * *